(12) United States Patent
Brown et al.

(10) Patent No.: US 8,140,970 B2
(45) Date of Patent: Mar. 20, 2012

(54) SYSTEM AND METHOD FOR SEMI-TRANSPARENT DISPLAY OF HANDS OVER A KEYBOARD IN REAL-TIME

(75) Inventors: Douglas Stuart Brown, Charlotte, NC (US); John Falk Kelley, Clarkesville, GA (US); James Robert Rudd, Charlotte, NC (US); Robert J. Torres, Colleyville, TX (US)

(73) Assignee: International Business Machines Corporation, Armonk, NY (US)

( * ) Notice: Subject to any disclaimer, the term of this patent is extended or adjusted under 35 U.S.C. 154(b) by 452 days.

(21) Appl. No.: 12/390,679

(22) Filed: Feb. 23, 2009

(65) Prior Publication Data
US 2010/0214226 A1   Aug. 26, 2010

(51) Int. Cl.
*G06F 3/00* (2006.01)
(52) U.S. Cl. .................. 715/709; 715/773; 345/168
(58) Field of Classification Search .................. 345/168; 715/709, 773
See application file for complete search history.

(56) References Cited

U.S. PATENT DOCUMENTS

| 5,767,842 | A * | 6/1998 | Korth ............................. 345/168 |
| 6,087,577 | A | 7/2000 | Yahata et al. |
| 6,388,181 | B2 | 5/2002 | Moe |
| 6,611,253 | B1 * | 8/2003 | Cohen ............................ 345/168 |
| 6,614,422 | B1 | 9/2003 | Rafii et al. |
| 7,042,442 | B1 | 5/2006 | Kanevsky et al. |
| 2004/0032398 | A1 | 2/2004 | Ariel et al. |
| 2004/0046744 | A1 * | 3/2004 | Rafii et al. .................... 345/168 |

FOREIGN PATENT DOCUMENTS

WO    2007140594 A1    12/2007

OTHER PUBLICATIONS

Huang, Zijian. KP Typing Tutor 71. [online]. 5 pages [retrieved on Sep. 24, 2008]. Retrieved from the Internet:<URL: http://3d2f.com/programs/17-414-kp-typing-tutor-download.shtml>.

* cited by examiner

*Primary Examiner* — Adam R Giesy
(74) *Attorney, Agent, or Firm* — Schmeiser, Olsen & Watts; Anna Linne

(57) ABSTRACT

A method for displaying a virtual keyboard with a semi-transparent overlay of an end user's hands. The method begins by receiving a video signal comprising an image of a keyboard and at least one hand belonging to the end user. Next the method creates a virtual keyboard comprising an outline for each key residing in the image of the keyboard. After creating the virtual keyboard, the method sends to a computer screen the virtual keyboard overlaying on top of the image of the keyboard. The overlaying giving an appearance that keys residing in the image of the keyboard obscured by the end user's hand are now visible.

12 Claims, 4 Drawing Sheets

SYSTEM AND METHOD FOR SEMI-TRANSPARENT DISPLAY OF HANDS OVER A KEYBOARD IN REAL-TIME

BACKGROUND OF THE INVENTION

The present invention relates generally to touch typing, and more particularly to graphically identifying where a typist's fingers are located on a keyboard in real-time.

Touch typing is the act of typing without using the sense of sight to find the keys; specifically a touch typist knows each key's location through muscle memory. While learning to touch type, it is often difficult to identify which keys the typist is using and which keys the typist must select without looking at the keyboard.

Additionally, in certain instances the typist's own hands obscure the keyboard and make identifying the current and/or proper keys difficult.

SUMMARY OF THE INVENTION

The present invention provides a method for displaying a virtual keyboard with a semi-transparent overlay of an end user's hands, said method comprising:

receiving a video signal comprising an image of a keyboard and at least one hand belonging to said end user;

creating said virtual keyboard comprising an outline for each key residing in said image of said keyboard; and sending to a computer screen said virtual keyboard overlaying on top of said image of said keyboard, said overlaying giving an appearance that keys residing in said image of said keyboard obscured by said at least one hand are visible.

DETAILED DESCRIPTION OF THE DRAWINGS

Definitions

The term 'virtual fingertip' as used herein means a digitally created outline of an end user's finger which may be highlighted in such a way so as to distinguish said virtual fingertip from other fingers belonging to the end user.
Specification Although certain embodiments of the present invention are described herein, it is understood that modifications may be made to the present invention without departing from its course and scope. Scope of the present invention is not limited to the number of constituting components, the materials thereof, the shapes thereof, the relative arrangement thereof, etc. Furthermore, while the accompanying drawings illustrate certain embodiments of the present invention, such drawings are not necessarily depicted to scale.

Figure 1:
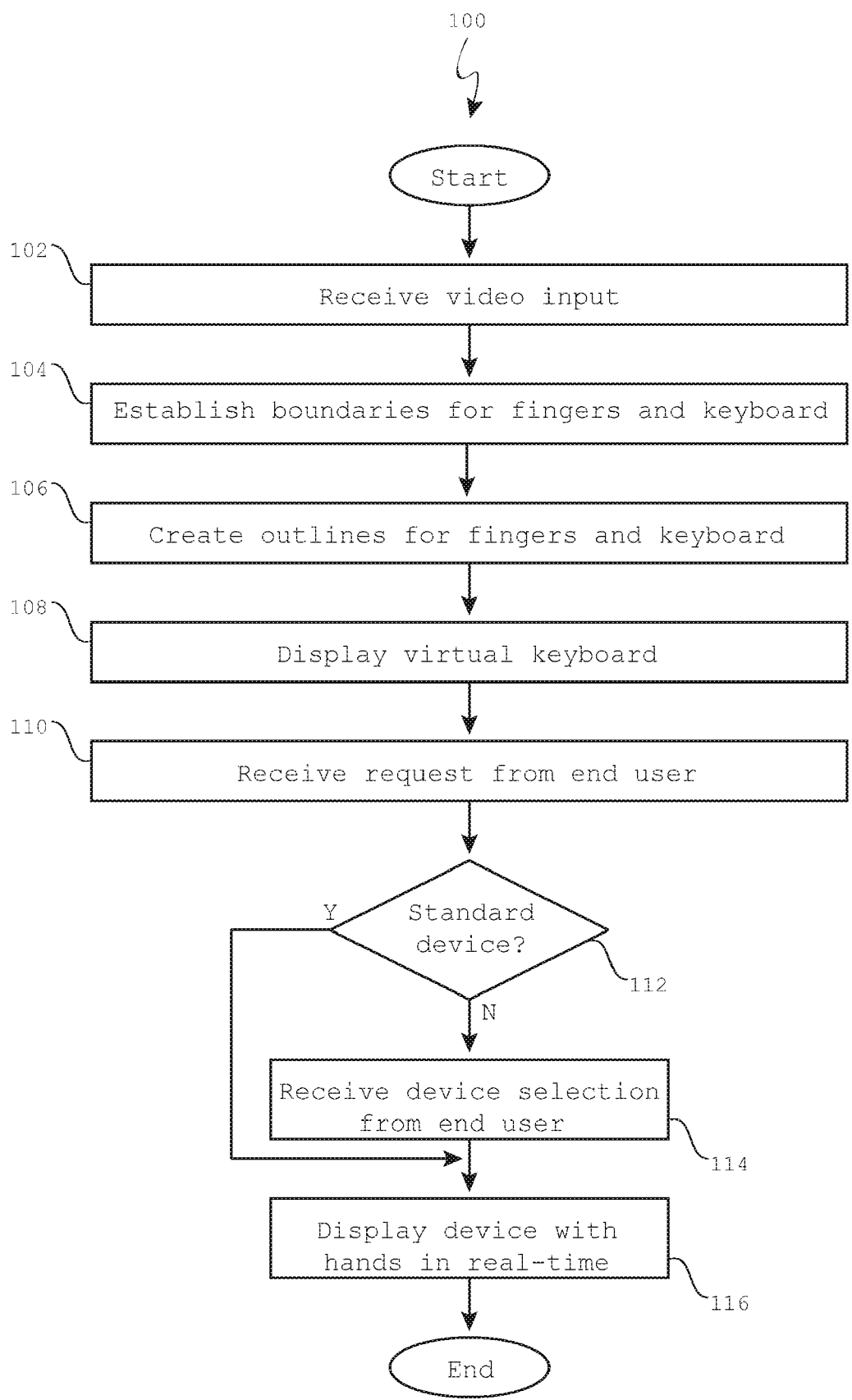
FIG. 1 illustrates a method for displaying a virtual keyboard with a semi-transparent overlay of an end user's hands, in accordance with embodiments of the present invention.

FIG. 1 illustrates a method 100 for displaying a virtual keyboard with a semi-transparent overlay of an end user's hands, in accordance with embodiments of the present invention.

The method 100 begins with step 102 which comprises receiving input from a video source. In one embodiment of the present invention, a video camera (i.e. webcam, closed circuit television (cctv), etc.) is connected to a computer system 900 (see FIG. 4, infra). The image(s) captured by said video camera may be, inter alia, a keyboard connected to said computer system and/or an end user's hands.

In one embodiment of the present invention, the video camera is capable of capturing color images of a keyboard connected to said computer system and/or an end user's hands. In an alternative embodiment of the present invention, the video camera is capable of capturing black and white or 'monochrome' images of a keyboard connected to said computer system and/or an end user's hands. In yet another embodiment of the present invention, the video camera is capable of capturing infrared images of a keyboard connected to said computer system and/or an end user's hands.

After receipt of input from said video source, step 102 ends and the method 100 continues with step 104 which comprises establishing boundaries for both the end user's fingers and the keyboard captured by the video camera.

In one embodiment of the present invention step 104 detects and identifies the orientation of the keyboard, the angle at which the keyboard was captured by the video camera, the specific location of each key residing within said keyboard, the boundaries of each key residing within said keyboard, etc.

Step 104 also detects and identifies the orientation of the end user's hands, the orientation of the end user's fingers, the angle at which the end user's hands were captured by the video camera, the angle at which the end user's fingers were captured by the video camera, the specific location of the end user's fingers in relation to the keyboard, as well as the boundaries for each finger.

Standard keystone corrections are applied to the composite image so that the partially obscured video image of the keyboard aligns correctly with the rectangular image of the selected keyboard device template. After completion of step 104, the method 100 continues with step 106 which comprises creating outlines for the end user's fingers and the keyboard.

In one embodiment of the present invention step 106 creates a virtual key outline for each key residing in the keyboard detected and identified pursuant to step 104. The virtual keys are transparent in nature and when overlaid on a video image of the end user's hands give the visual effect that the end user's hands are in fact transparent. Said end user is then able to identify keys obscured by their hands. The virtual key outlines will be used by the present invention to highlight the appropriate key for the end user to strike. The highlighting may be in a color that is easily distinguishable from the color of the keyboard and the environment in which the keyboard rests.

Additionally, step 106 creates virtual finger tip outlines for each finger on both hands of the end user. The virtual finger tips will be used by the present invention to highlight the appropriate finger in which to strike the appropriate key. The finger tip outline highlighting may be in a color that is easily distinguishable from the color of the keyboard and the environment in which the keyboard rests.

In one embodiment of the present invention, the color selected for the finger tip outlines matches the color selected for the key outlines. After completion of step 106, the method 100 continues with step 108 which comprises displaying the virtual keyboard.

Figure 4:
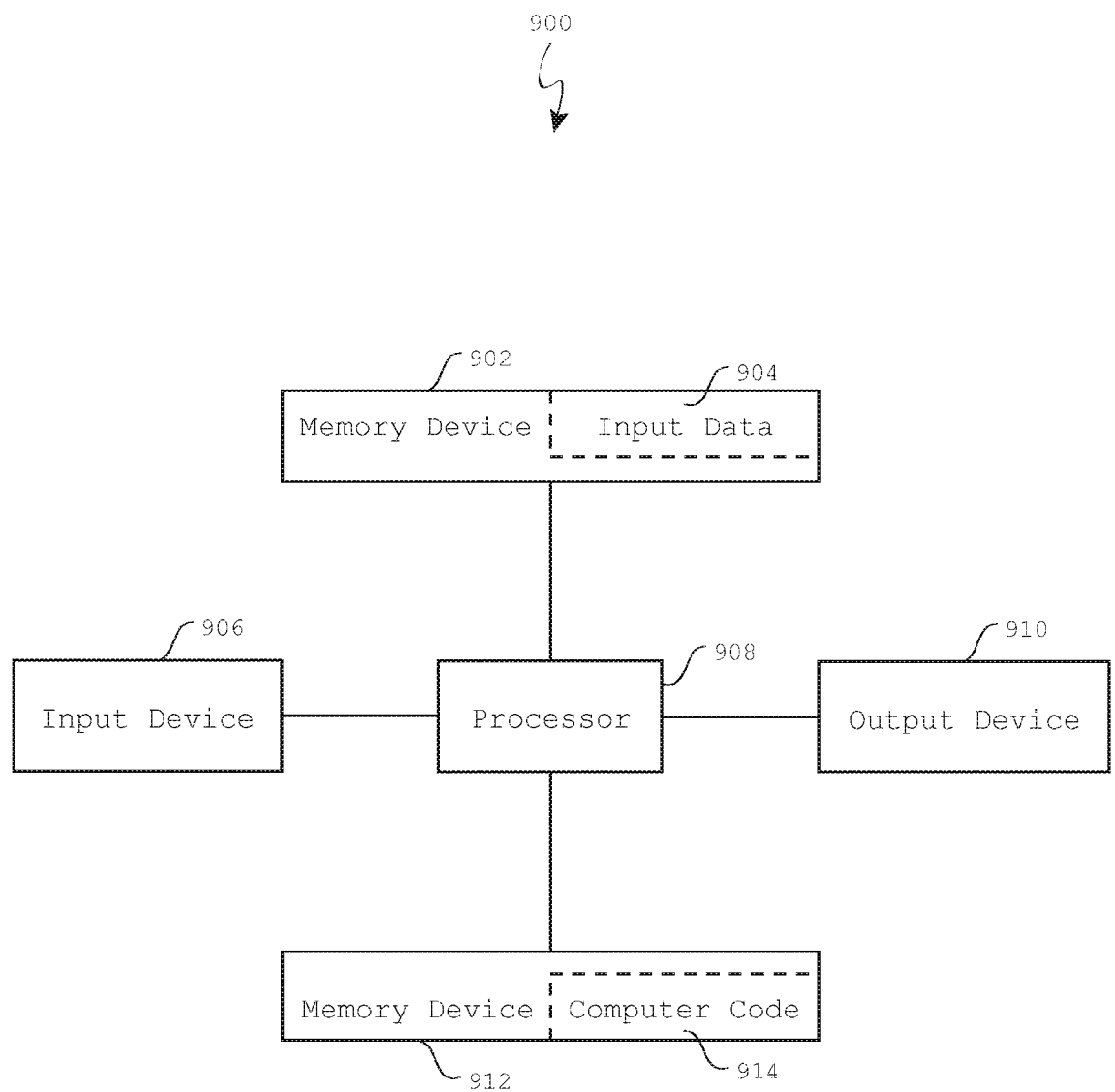
FIG. 4 illustrates a computer system which may facilitate a method for displaying a virtual keyboard with a semi-transparent overlay of an end user's hands, in accordance with embodiments of the present invention.

In one embodiment of the present invention step 108 sends the transparent virtual key outlines, collectively called the virtual keyboard, to an output device 910; specifically a computer screen (see FIG. 4, infra). The virtual keyboard is displayed in the computer screen on top of a live video stream of the keyboard the end user is utilizing with their hands. The effect of overlaying the virtual keyboard on top of the live video stream of the actual keyboard is that to the end user, viewing said computer screen the keys obscured by the end user's hands/fingers are transparently represented on the screen. This gives the illusion that he end user's hands are semi-transparent.

The end user can then identify the keys of the keyboard from the computer screen instead of resorting to looking down at the keyboard. This act reinforces the end user's ability to learn, practice, and/or perfect their touch typing skills. After completion of step 108, the method 100 continues with step 110 which comprises waiting to receive a request from the end user.

In one embodiment of the present invention, step 110 awaits a request from the end user to display either a standard keyboard arrangement or an alternative keyboard arrangement. For example, applications such as Adobe® Illustrator, Adobe® Photoshop, and various videogames utilize unique keyboard shortcuts to perform an action. The present invention has the capability to display such alternative keyboard shortcuts on the individual keys instead of the standard key values, should the end user request such a display.

For example, in Adobe® Illustrator the 'selection tool' is represented by an arrow and accessible by the key 'v'. The present invention is capable of displaying the arrow icon onto the 'v' key on the keyboard so an end user may easily identify the 'selection tool' is accessible via the arrow key which in turn is the 'v' key on the keyboard.

In response to receiving a request from the end user, step 110 ends and the method 100 continues with step 112 which comprises determining whether the device the end user specified pursuant to step 110 is a standard keyboard arrangement or an alternative keyboard arrangement.

In one embodiment of the present invention, if the request specifies a standard keyboard arrangement be displayed on top of the end user's hands, step 112 returns a response of 'yes' and the method 100 continues with step 116 which comprises displaying the device, in this case a standard keyboard arrangement, to the computer screen in real-time.

However, if the end user's request specifies a non-standard keyboard arrangement, step 112 returns a response of 'no' and the method 100 continues with step 114 which comprises receiving a selection from the end user.

In an alternative embodiment of the present invention, the method 100 presumes the end user wishes to have a standard keyboard arrangement displayed and will only change the virtual display in response to receiving a request for a non-standard keyboard arrangement.

Step 114 comprises receiving a selection from the end user. Receipt of the selection is in response to sending a list of devices (i.e. different keyboard arrangements) which the present invention can display to the end user on the output device 910 (see FIG. 4, infra). The list of devices which the present invention can display was sent to the end user in response to step 112 returning a response of 'no'. Moreover, the list of devices which the present invention can display may be made up of devices known to the present invention (i.e. prepackaged keyboard arrangements) as well as devices which the present invention already received, established boundaries for, created virtually, and displayed pursuant to step 102 through 108.

Upon receipt of a selected device from the end user, step 114 retrieves the device boundary and outline information from a repository controlled by the present invention. After retrieving the selected device information, step 114 ends and the method 100 continues with step 116 which comprises displaying the device, in this case the device corresponding to the selection, to the computer screen in real-time.

After displaying the device to the end user via the output device 910 (i.e. computer screen) in real-time, step 116 is completed and the method 100 ends (see FIG. 4, infra).

Figure 2:
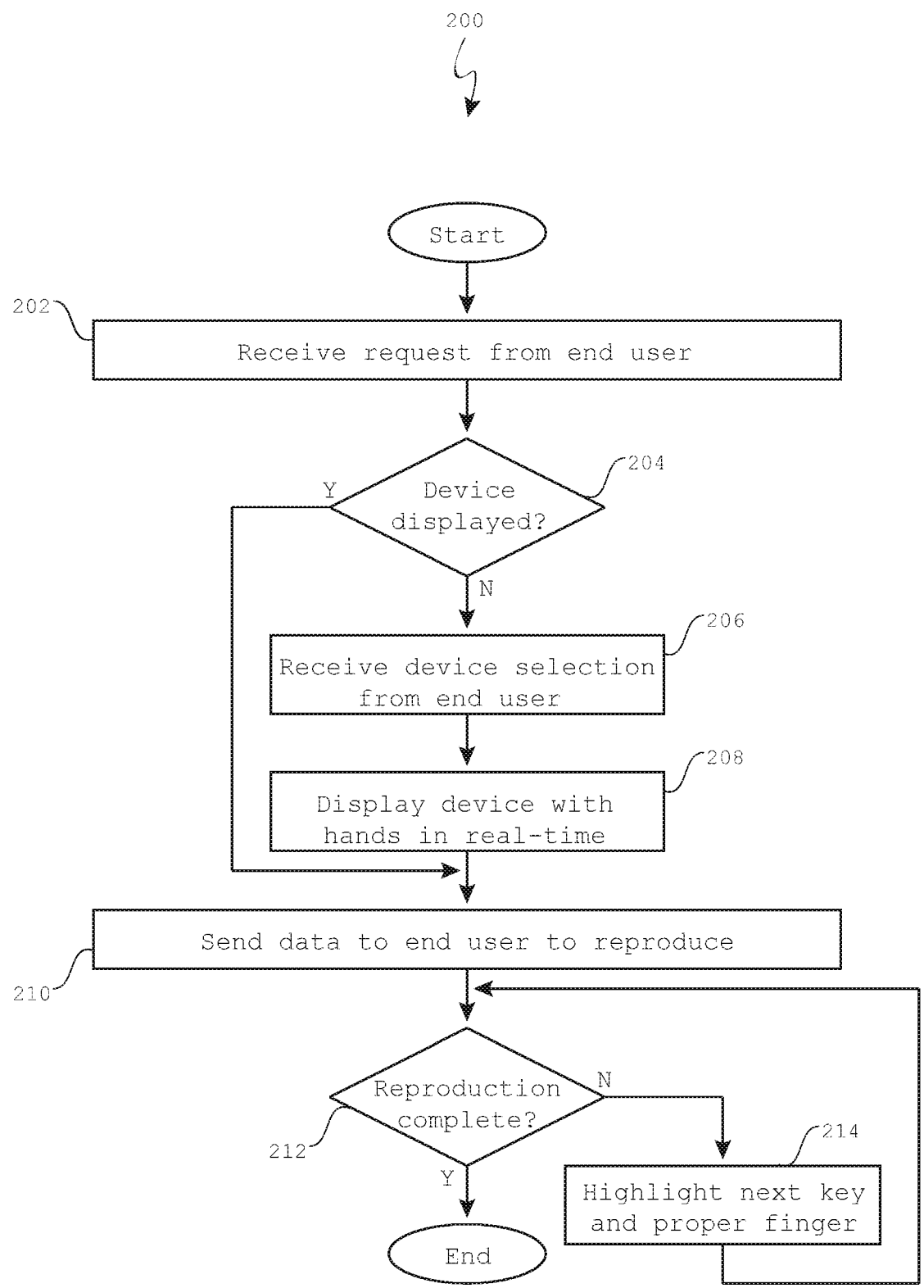
FIG. 2 illustrates a method for aiding an end user with touch typing by means of displaying a virtual keyboard with a semi-transparent overlay of an end user's hands, in accordance with embodiments of the present invention.

FIG. 2 illustrates a method 200 for aiding an end user with touch typing by means of displaying a virtual keyboard with a semi-transparent overlay of an end user's hands, in accordance with embodiments of the present invention. The method 200 begins with step 202 which comprises receiving a request from the end user.

In one embodiment of the present invention step 202 awaits an end user's request to utilize a virtual keyboard to practice touch typing. In response to receiving the request from the end user, step 202 ends and the method 200 continues with step 204 which comprises determining whether a device (i.e. transparently displayed standard keyboard arrangement) is being displayed on a computer monitor 910 (see FIG. 4, infra).

In one embodiment of the present invention, if a device is already being displayed to the output device 910, step 202 returns a response of 'yes' and the method 200 continues with step 210 which comprises sending data to the end user to reproduce by means of typing on the keyboard.

However, if no device is currently being displayed on the computer monitor 910, step 204 returns a response of 'no' and the method 200 continues with step 206 which comprises receiving a selection from the end user.

Step 206 comprises receiving a selection from the end user. Receipt of the selection is in response to sending a list of devices (i.e. unique keyboard arrangements) which the present invention can display. The list of devices which the present invention can display was sent to the end user in response to step 204 returning a response of 'no'. Moreover, the list of devices which the present invention can display may be made up of devices known to the present invention (i.e. prepackaged keyboard arrangements) as well as devices which the present invention already received, established boundaries for, created virtually, and displayed pursuant to step 102 through 108 (see FIG. 1, supra).

Upon receipt of the selection from the end user, step 206 retrieves the device boundary and outline information from a repository controlled by the present invention. After retrieving the selected device information, step 206 ends and the method 200 continues with step 208 which comprises displaying the device, in this case the keyboard arrangement corresponding to the selection and pursuant to 206, to the computer screen in real-time.

After displaying the device to the end user via the output device 910 (i.e. computer screen) in real-time, step 208 is completed and the method 200 continues with step 210 which comprises sending data to the end user to reproduce utilizing both the actual and virtual keyboards.

Step 210 comprises sending data to the end user to reproduce utilizing both the actual and virtual keyboards. In one embodiment of the present invention, depending on the device displayed to the end user, the data will conform to utilize the keyboard arrangement of said displayed device.

For example, if the keyboard arrangement is that of a standard keyboard, the data sent to the end user may be at least one paragraph in which the end user will retype the data. If the keyboard arrangement is that of a keyboard utilizing Adobe® Illustrator, the data sent to the end user may be a list of commands to invoke and perform while utilizing the keyboard. After completion of step 210, the method 200 continues with step 212 which comprises determining whether reproduction of the data sent is complete.

In one embodiment of the present invention step 212 compares the last keystroke received and the last data value residing in the data sent to the end user pursuant to step 210. If the last keystroke matches the last data value, step 212 returns a response 'yes' and the method 200 ends. However, if the last keystroke received and the last data value do not match, step 212 returns a response 'no' and the method 200 continues with step 214 which comprises highlighting the next key the end user must press and the proper finger to strike the highlighted key.

In one embodiment of the present invention, step 214 identifies the next data value the end user should provide and correlates said data value with the appropriate key on the virtual keyboard. The correlated key is then highlighted on the virtual keyboard in such a way so as to distinguish the correlated key from the surrounding keys. Additionally, step 214 identifies the appropriate finger the end user should utilize to strike the highlighted key. The virtual fingertip of the appropriate finger, created pursuant to step 106 (see FIG. 1, supra), is highlighted in such a way so as to distinguish the highlighted fingertip from the end user's other fingers.

For example, if the next data value the end user should provide is the 'F' key, step 214 would highlight the virtual 'F' key as well as highlight the end user's left index fingertip since the 'F' key should be struck with the left index finger.

After completion of step 214, the method 200 returns to step 212 to determine whether reproduction of the data sent is complete.

Figure 3:
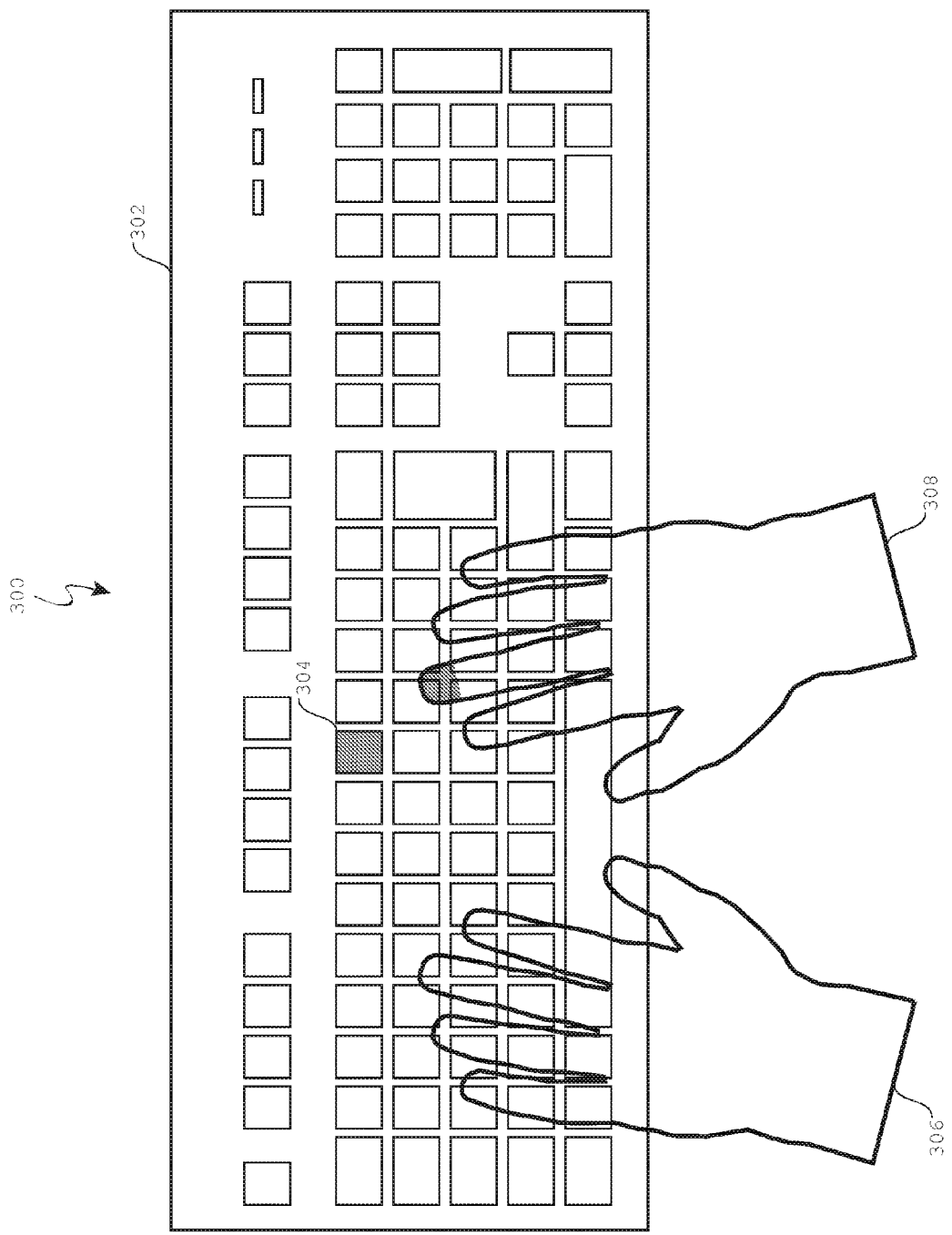
FIG. 3 illustrates an example of displaying a virtual keyboard with a semi-transparent overlay of an end user's hands, in accordance with embodiments of the present invention.

FIG. 3 illustrates an example 300 of displaying a virtual keyboard 302 with a semi-transparent overlay of the end user's hands 306-308, in accordance with embodiments of the present invention.

The example comprises the end user's left hand 306, the end user's right hand 308, and the virtual keyboard 302 being displayed over the end user's hands. The effect of displaying the virtual keyboard 302 on top of the end user's left 306 and right 308 hands, is the appearance of the keys which would naturally be obscured due to the end user's hands.

Additionally, the example 300 comprises a highlighted key 304 residing within the virtual keyboard 302 which, according to step 214 (see FIG. 2, supra), is the next data value the end user must enter. Since the highlighted key is conventionally struck with a user's right hand middle finger, the end user's right hand 308 also comprises a highlighted middle fingertip. The effect of the highlighted key and fingertip is that an end user can identify on the computer screen 910 (see FIG. 4, infra) which key is next and which finger must strike the next key; all without out moving their eyes from the screen to the keyboard. This action reinforces the learning, practicing, and/or perfecting touch typing.

FIG. 4 illustrates a computer system 900 which may facilitate a method for displaying a virtual keyboard with a semi-transparent overlay of an end user's hands, in accordance with embodiments of the present invention.

The computer system 900 comprises a processor 908, an input device 906 coupled to the processor 908, an output device 910 coupled to the processor 908, and memory devices 902 and 912 each coupled to the processor 908.

The input device 906 may be, inter alia, a keyboard, a mouse, a keypad, a touchscreen, a voice recognition device, a sensor, a network interface card (NIC), a Voice/video over Internet Protocol (VOIP) adapter, a wireless adapter, a telephone adapter, a dedicated circuit adapter, etc.

The output device 910 may be, inter alia, a printer, a plotter, a computer screen, a magnetic tape, a removable hard disk, a floppy disk, a NIC, a VOIP adapter, a wireless adapter, a telephone adapter, a dedicated circuit adapter, an audio and/or visual signal generator, a light emitting diode (LED), etc.

The memory devices 902 and 912 may be, inter alia, a cache, a dynamic random access memory (DRAM), a read-only memory (ROM), a hard disk, a floppy disk, a magnetic tape, an optical storage such as a compact disc (CD) or a digital video disc (DVD), etc. The memory device 912 includes a computer code 914 which is a computer program that comprises computer-executable instructions.

The computer code 914 includes, inter alia, an algorithm used for transparently displaying a keyboard over an end user's hands in real-time according to the present invention. The processor 908 executes the computer code 914. The memory device 902 includes input data 904. The input data 904 includes input required by the computer code 914. The output device 910 displays output from the computer code 914. Either or both memory devices 902 and 912 (or one or more additional memory devices not shown in FIG. 4) may be used as a computer usable medium (or a computer readable medium or a program storage device) having a computer readable program embodied therein and/or having other data stored therein, wherein the computer readable program comprises the computer code 914. Generally, a computer program product (or, alternatively, an article of manufacture) of the computer system 900 may comprise said computer usable medium (or said program storage device).

Any of the components of the present invention can be deployed, managed, serviced, etc. by a service provider that offers to deploy or integrate computing infrastructure with respect to a process for transparently displaying a keyboard over an end user's hands in real-time. Thus, the present invention discloses a process for supporting computer infrastructure, comprising integrating, hosting, maintaining and deploying computer-readable code into a computing system (e.g., computing system 900), wherein the code in combination with the computing system is capable of performing a method for transparently displaying a keyboard over an end user's hands in real-time.

In another embodiment, the invention provides a business method that performs the process steps of the invention on a subscription, advertising and/or fee basis. That is, a service provider, such as a Solution Integrator, can offer to create, maintain, support, etc. a process for transparently displaying a keyboard over an end user's hands in real-time. In this case, the service provider can create, maintain, support, etc. a computer infrastructure that performs the process steps of the invention for one or more customers. In return, the service provider can receive payment from the customer(s) under a subscription and/or fee agreement, and/or the service provider can receive payment from the sale of advertising content to one or more third parties.

While FIG. 4 shows the computer system 900 as a particular configuration of hardware and software, any configuration of hardware and software, as would be known to a person of ordinary skill in the art, may be utilized for the purposes stated supra in conjunction with the particular computer system 900 of FIG. 4. For example, the memory devices 902 and 912 may be portions of a single memory device rather than separate memory devices.

While particular embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed:

1. A method for displaying a virtual keyboard with a semi-transparent overlay of an end user's hands, said method comprising:
   receiving, by a processor of a computer system, a video signal comprising an image of a keyboard and at least one hand belonging to said end user;
   said processor creating said virtual keyboard comprising an outline for each key residing in said image of said keyboard;
   said processor sending to a computer screen said virtual keyboard overlaying on top of said image of said keyboard, said overlaying giving an appearance that keys residing in said image of said keyboard obscured by said at least one hand are visible;
   prior to said sending to said computer screen, said processor creating a virtual fingertip for each finger on each hand of said at least one hand;
   subsequent to said sending to said computer screen:
      said processor sending to said end user data to reproduce, said data comprising at least one character capable of being typed on a keyboard from which said image of said keyboard was created; and
      prior to each character of said at least one character being typed by said end user, said processor highlighting a key residing in said virtual keyboard corresponding to a next character to be typed, and highlighting a specific virtual fingertip of a hand of said at least one hand corresponding to a specific finger which would be used to strike said highlighted key.

2. The method of claim 1, said method further comprising:
   sending to said end user a list comprising at least one alternative keyboard arrangement which may be displayed on said hands belonging to said end user, said sending said list being in response to receiving from said end user a request for said list;
   receiving from said end user identification of a specific alternative keyboard arrangement, said specific alternative keyboard arrangement being from said list; and
   sending to said computer screen said specific alternative keyboard arrangement overlaying on top of said image of said keyboard, said overlaying giving an appearance that keys residing in said image of said keyboard obscured by said at least one hand are visible.

3. The method of claim 2, where subsequent to said sending said specific alternative keyboard arrangement:
   sending to said end user data to reproduce, said data comprising at least one character capable of being typed on said specific alternative keyboard arrangement; and
   prior to each character of said at least one character being typed by said end user, highlighting a key residing in said specific alternative keyboard arrangement corresponding to a next character to be typed, and highlighting a virtual fingertip of a hand of said at least one hand corresponding to a finger which would be used to strike said highlighted key, said virtual fingertip being created prior to said sending to said end user said data.

4. A computer program product, comprising a computer readable physically tangible storage device having a computer-readable program code stored therein, said computer-readable program code containing instructions that when executed by a processor of a computer system implement a method for displaying a virtual keyboard with a semi-transparent overlay of an end user's hands, said method comprising:
   said processor receiving a video signal comprising an image of a keyboard and at least one hand belonging to said end user;
   said processor creating said virtual keyboard comprising an outline for each key residing in said image of said keyboard;
   said processor sending to a computer screen said virtual keyboard overlaying on top of said image of said keyboard, said overlaying giving an appearance that keys residing in said image of said keyboard obscured by said at least one hand are visible;
   prior to said sending to said computer screen, said processor creating a virtual fingertip for each finger on each hand of said at least one hand;
   subsequent to said sending to said computer screen:
      said processor sending to said end user data to reproduce, said data comprising at least one character capable of being typed on a keyboard from which said image of said keyboard was created; and
      prior to each character of said at least one character being typed by said end user, said processor highlighting a key residing in said virtual keyboard corresponding to a next character to be typed, and highlighting a specific virtual fingertip of a hand of said at least one hand corresponding to a specific finger which would be used to strike said highlighted key.

5. The computer program product of claim 4, said method further comprising:
   sending to said end user a list comprising at least one alternative keyboard arrangement which may be displayed on said hands belonging to said end user, said sending said list being in response to receiving from said end user a request for said list;
   receiving from said end user identification of a specific alternative keyboard arrangement, said specific alternative keyboard arrangement being from said list; and
   sending to said computer screen said specific alternative keyboard arrangement overlaying on top of said image of said keyboard, said overlaying giving an appearance that keys residing in said image of said keyboard obscured by said at least one hand are visible.

6. The computer program product of claim 5, where subsequent to said sending said specific alternative keyboard arrangement:
   sending to said end user data to reproduce, said data comprising at least one character capable of being typed on said specific alternative keyboard arrangement; and
   prior to each character of said at least one character being typed by said end user, highlighting a key residing in said specific alternative keyboard arrangement corresponding to a next character to be typed, and highlighting a virtual fingertip of a hand of said at least one hand corresponding to a finger which would be used to strike said highlighted key, said virtual fingertip being created prior to said sending to said end user said data.

7. A computing system comprising a processor coupled to a computer-readable physically tangible storage device, said storage device comprising a software application, said software application comprising instructions that when executed by said processor, implement a method for displaying a virtual keyboard with a semi-transparent overlay of an end user's hands, said method comprising:

said processor receiving a video signal comprising an image of a keyboard and at least one hand belonging to said end user;

said processor creating said virtual keyboard comprising an outline for each key residing in said image of said keyboard;

said processor sending to a computer screen said virtual keyboard overlaying on top of said image of said keyboard, said overlaying giving an appearance that keys residing in said image of said keyboard obscured by said at least one hand are visible;

prior to said sending to said computer screen, said processor creating a virtual fingertip for each finger on each hand of said at least one hand;

subsequent to said sending to said computer screen:
said processor sending to said end user data to reproduce, said data comprising at least one character capable of being typed on a keyboard from which said image of said keyboard was created; and
prior to each character of said at least one character being typed by said end user, said processor highlighting a key residing in said virtual keyboard corresponding to a next character to be typed, and highlighting a specific virtual fingertip of a hand of said at least one hand corresponding to a specific finger which would be used to strike said highlighted key.

8. The computing system of claim 7, said method further comprising:

sending to said end user a list comprising at least one alternative keyboard arrangement which may be displayed on said hands belonging to said end user, said sending said list being in response to receiving from said end user a request for said list;

receiving from said end user identification of a specific alternative keyboard arrangement, said specific alternative keyboard arrangement being from said list; and sending to said computer screen said specific alternative keyboard arrangement overlaying on top of said image of said keyboard, said overlaying giving an appearance that keys residing in said image of said keyboard obscured by said at least one hand are visible.

9. The computing system of claim 8, where subsequent to said sending said specific alternative keyboard arrangement:

sending to said end user data to reproduce, said data comprising at least one character capable of being typed on said specific alternative keyboard arrangement; and prior to each character of said at least one character being typed by said end user, highlighting a key residing in said specific alternative keyboard arrangement corresponding to a next character to be typed, and highlighting a virtual fingertip of a hand of said at least one hand corresponding to a finger which would be used to strike said highlighted key, said virtual fingertip being created prior to said sending to said end user said data.

10. A process for supporting computer infrastructure, said process comprising providing at least one support service for at least one of creating, integrating, hosting, maintaining, and deploying computer-readable code in a computing system, wherein said code in combination with the computing system is capable of implementing a method for displaying a virtual keyboard with a semi-transparent overlay of an end user's hands, said method comprising:

receiving, by a processor of the computing system, a video signal comprising an image of a keyboard and at least one hand belonging to said end user;

said processor creating said virtual keyboard comprising an outline for each key residing in said image of said keyboard;

said processor sending to a computer screen said virtual keyboard overlaying on top of said image of said keyboard, said overlaying giving an appearance that keys residing in said image of said keyboard obscured by said at least one hand are visible;

prior to said sending to said computer screen, said processor creating a virtual fingertip for each finger on each hand of said at least one hand;

subsequent to said sending to said computer screen:
said processor sending to said end user data to reproduce, said data comprising at least one character capable of being typed on a keyboard from which said image of said keyboard was created; and
prior to each character of said at least one character being typed by said end user, said processor highlighting a key residing in said virtual keyboard corresponding to a next character to be typed, and highlighting a specific virtual fingertip of a hand of said at least one hand corresponding to a specific finger which would be used to strike said highlighted key.

11. The process for supporting computer infrastructure of claim 10, said method further comprising:

sending to said end user a list comprising at least one alternative keyboard arrangement which may be displayed on said hands belonging to said end user, said sending said list being in response to receiving from said end user a request for said list;

receiving from said end user identification of a specific alternative keyboard arrangement, said specific alternative keyboard arrangement being from said list; and sending to said computer screen said specific alternative keyboard arrangement overlaying on top of said image of said keyboard, said overlaying giving an appearance that keys residing in said image of said keyboard obscured by said at least one hand are visible.

12. The process for supporting computer infrastructure of claim 11, where subsequent to said sending said specific alternative keyboard arrangement:

sending to said end user data to reproduce, said data comprising at least one character capable of being typed on said specific alternative keyboard arrangement; and prior to each character of said at least one character being typed by said end user, highlighting a key residing in said specific alternative keyboard arrangement corresponding to a next character to be typed, and highlighting a virtual fingertip of a hand of said at least one hand corresponding to a finger which would be used to strike said highlighted key, said virtual fingertip being created prior to said sending to said end user said data.

\* \* \* \* \*